US012771753B1

(12) United States Patent
Berger

(10) Patent No.: US 12,771,753 B1
(45) Date of Patent: Oct. 20, 2026

(54) AI SYSTEMS AND METHODS FOR ADAPTIVE CROSS-DOMAIN COMPOSITE RELATIONAL SYNTHESIS AND INTEROPERABILITY

(71) Applicant: RAIN HOLDINGS, INC., Laguna Beach, CA (US)

(72) Inventor: Marc Berger, Laguna Beach, CA (US)

(73) Assignee: RAIN HOLDINGS, INC., Laguna Beach, CA (US)

( * ) Notice: Subject to any disclaimer, the term of this patent is extended or adjusted under 35 U.S.C. 154(b) by 0 days.

(21) Appl. No.: 19/413,985

(22) Filed: Dec. 9, 2025

(51) Int. Cl.
*H04L 67/30* (2022.01)
*G06N 20/00* (2019.01)

(52) U.S. Cl.
CPC ............. *H04L 67/30* (2013.01); *G06N 20/00* (2019.01)

(58) Field of Classification Search
CPC ................................ H04L 67/30; G06N 20/00
See application file for complete search history.

(56) References Cited

U.S. PATENT DOCUMENTS

| | | | | |
|---|---|---|---|---|
| 9,430,662 | B2 * | 8/2016 | Giambiagi | G06F 21/604 |
| 10,277,608 | B2 * | 4/2019 | Krishnamurthy | H04L 63/123 |
| 10,936,959 | B2 * | 3/2021 | Baveja | G06N 20/00 |
| 11,556,862 | B2 | 1/2023 | Polleri et al. | |
| 11,593,560 | B2 | 2/2023 | Zhou et al. | |
| 11,593,622 | B1 | 2/2023 | Gandhi et al. | |
| 11,755,754 | B2 | 9/2023 | Joshi et al. | |
| 11,775,663 | B2 | 10/2023 | Laurance et al. | |
| 2008/0243607 | A1 | 10/2008 | Rohan et al. | |
| 2021/0383525 | A1 | 12/2021 | Lee et al. | |
| 2021/0392132 | A1 | 12/2021 | Olden et al. | |
| 2021/0406779 | A1 | 12/2021 | Hu et al. | |
| 2023/0401461 | A1 | 12/2023 | Gueret et al. | |
| 2024/0202221 | A1 | 6/2024 | Siebel et al. | |
| 2025/0328341 | A1 | 10/2025 | Gutierrez | |

OTHER PUBLICATIONS

Feng Yuan; DARec: Deep Domain Adaptation for Cross-Domain Recommendation via Transferring Rating Patterns; May 26, 2019; arXiv:1905.10760v1. (Year: 2019).*

Matthias Fey; Relational Deep Learning: Graph Representation Learning on Relational Databases; Dec. 7, 2023; arXiv:2312.04615v1. (Year: 2023).*

Fey, Matthias. et al. Relational deep learning: Graph representation learning on relational databases. arXiv preprint arXiv:2312.04615, 1-21 (2023).

Sidi-Ali, Muhammad Adamu et al. Adapting Performance and Emotional Support Feedback to Cultural Differences. UMAP '19: Proceedings of the 27th ACM Conference on User Modeling, Adaptation and Personalization :318-326 (2019).

(Continued)

*Primary Examiner* — David Yi
*Assistant Examiner* — Paul Coleman
(74) *Attorney, Agent, or Firm* — Wilson Sonsini Goodrich & Rosati

(57) ABSTRACT

The present disclosure provides an adaptive artificial-intelligence framework for modeling, synthesizing, and evaluating relationships among multiple discrete entities. The system aggregates inputs into composite relation entities (CREs). A CRE is a machine-enforced identity object with inseparable structural metadata, and is not a simple embedding, vector, or record.

30 Claims, 6 Drawing Sheets

(56) References Cited

OTHER PUBLICATIONS

Wu, Zijian. et al. Cross-domain decision making with parameter transfer based on value function. Information Sciences 610:777-799 (2022).

Yin, Gongzhu. et al. Beyond individuals: Modeling mutual and multiple interactions for inductive link prediction between groups. Proceedings of the Sixteenth ACM International Conference on Web Search and Data Mining :751-759 (2023).

Yuan, Feng. et al. DARec: Deep domain adaptation for cross-domain recommendation via transferring rating patterns. arXiv preprint arXiv:1905.10760, 1-7 (2019).

He, Sudao. et al. A Latent Representation Generalizing Network for Domain Generalization in Cross-Scenario Monitoring. IEEE transactions on neural networks and learning systems 35(11):16644-16658 (2024).

Li, Zexu. et al. Cross-domain AI towards 6G: requirements, solution, and validation. 2024 International Wireless Communications and Mobile Computing (IWCMC). IEEE :1-5 (2024).

* cited by examiner

AI SYSTEMS AND METHODS FOR ADAPTIVE CROSS-DOMAIN COMPOSITE RELATIONAL SYNTHESIS AND INTEROPERABILITY

BACKGROUND

Matching and recommendation systems can be useful in connecting users, items, or entities based on shared characteristics, preferences, or contextual factors. Such systems may be applied across a variety of domains including social networking, professional recruiting, e-commerce, and travel planning.

SUMMARY

The present disclosure relates generally to artificial intelligence systems and computational architectures for relational modeling. More specifically, it pertains to methods, systems, and computer-implemented frameworks that enable adaptive synthesis, compatibility assessment, and dynamic learning among multiple entities using aggregated relational representations. Central to the present disclosure are Composite Relational Entities (CREs), persistent machine identity objects which comprise inseparable governance metadata, lineage anchors, and trust coefficients and which cannot be substituted with embeddings, vectors, or feature tables.

Conventional distributed learning systems lack a mechanism for representing multi-entity relational structure as persistent computational objects. Existing approaches rely on derivative embeddings or repeated pairwise comparisons, which require high bandwidth during synchronization, lack persistent relational memory, and provide no native auditability, governance influence, or interpretability. A CRE is not a relational object or embedding; it is an artificial-intelligence identity construct with lifecycle and governance enforcement properties absent from existing data structures. The disclosed architecture addresses these deficiencies through CREs which can maintain persistent identity, embed trust and governance metadata, and propagate efficiently through delta-based synchronization.

Unlike conventional relational-modeling, embedding, or recommender-system approaches, a CRE is a persistent machine identity object which comprises inseparable governance metadata, lineage anchors, and trust coefficients, and which cannot be substituted with embeddings, vectors, or feature tables. CREs may be combined to form composites. In addition, CREs may be continually updated and refined through adaptive feedback derived from observed outcomes. Each CRE may be a mathematically independent analytical object, distinct from its constituent inputs, and serves as a fundamental unit of representation, comparison, and learning within the system.

Conventional approaches to compatibility assessment and recommendation tend to rely on static feature matching, linear weighting, or domain-specific heuristics, limiting their adaptability and interpretability.

Existing solutions generally fail to provide an integrated framework that continuously refines its understanding of relational dynamics across heterogeneous data domains or that enables cross-domain learning transfer. No existing framework transforms the combination of multiple independent entities into a single, learnable persistent machine identity object comprising inseparable governance metadata, lineage anchors, and trust coefficients that serve as units of relational comparison.

The present disclosure provides a computer-implemented framework for adaptive relational modeling and compatibility analysis among multiple entities. In some embodiments, the disclosed system, enables the aggregation, synthesis, and continuous refinement of relationship data across distinct functional domains.

Rather than evaluate entities in isolation, the system described herein transforms relationships into CREs, persistent machine identity objects comprising inseparable governance metadata, lineage anchors, and trust coefficients, which may then be compared, optimized, and changed over time and through different learning domains.

The system may be configured to receive a plurality of entity profiles, normalize their attributes, generate CREs, and adjusts or updates model parameters according to observed results. The framework can further include adaptive learning mechanisms, and interpretability layers for human-readable explanation of compatibility results. In some embodiments, the system is scalable. The system may be configured to generate CREs based on detected relationships among input data. In some embodiments, the system is configured to compare and adjust CREs based on performance criteria, feedback data, or additional data inputs relevant to CRE adjustment.

The system may be configured for use across a range of industrial domains. The system may comprise multiple engines, wherein each engine corresponds to a domain. The system may support applications such as social matchmaking, professional recruitment, collaborative team assembly, logistics optimization, and dynamic pairing systems. Generating CREs may provide a scalable framework for adaptive compatibility modeling across industries which require optimized human, organizational, or machine-to-machine interaction.

Disclosed herein is a computer-implemented method for generating and refining a composite relational entity (CRE) executed at one or more computer processors, wherein the one or more computer processors are configured to execute operations comprising: obtaining two or more entity profiles; assigning, for each entity profile, a trust coefficient and governance metadata; generating, by a relational synthesis engine comprising one or more model parameters, a CRE using the two or more entity profiles, wherein the CRE comprises: a persistent identifier, the governance metadata; the trust coefficients; an interpretability vector; and a lineage anchor referencing a prior CRE state; wherein the persistent identifier, the governance metadata, the trust coefficients, the interpretability vector, and the lineage anchor are inseparable structural components of the CRE; generating a compatibility score for the CRE, wherein the compatibility score represents compatibility between the two or more entities; capturing observed feedback associated with at least one of the two or more entities; computing a residual deviation between the compatibility score and the feedback; updating the one or more model parameters using a governance-weighted update rule that modulates the residual deviation based on the trust coefficients and governance metadata; and regenerating the CRE using the updated one or more model parameters only after validation of the persistent identifier and lineage anchor. In some embodiments, the lineage anchor is null, indicating the CRE has no prior state. In some embodiments, the lineage anchor comprises a timestamp, a hash, or a cryptographic marker referencing the prior CRE state. In some embodiments, regenerating the CRE comprises validating an audit signature tied to the persistent identifier and the lineage anchor. In some embodiments, the method further comprises blocking regenerating of the CRE when the lineage anchor fails a continuity validation. In some embodiments, the CRE is structurally non-substitutable with embeddings, weighted attribute vectors, or similarity metrics. In some embodiments, the one or more entity profiles comprise normalized multi-attribute vectors. In some embodiments, assigning the trust coefficients is based at least in part on a historical consistency of the two or more entity profiles. In some embodiments, the governance metadata comprises a governance weight, and wherein the governance weight is applied during updating the one or more model parameters. In some embodiments, regenerating the CRE comprises preserving the persistent identifier, and wherein the regenerated CRE comprises the persistent identifier. In some embodiments, the interpretability vector comprises sensitivities of the compatibility score to underlying attributes. In some embodiments, updating the one or more model parameters comprises applying a learning-rate coefficient modulated by governance metadata. In some embodiments, capturing the feedback comprises recording behavioral outcomes through an interactive interface. In some embodiments, regenerating the CRE occurs within a trusted execution environment. In some embodiments, the method further comprises embedding metadata directly into a latent structure of the CRE, thereby enforcing metadata inseparability. In some embodiments, the method further comprises verifying an audit token prior to regenerating the CRE. In some embodiments, wherein the residual deviation is temporally weighted.

Disclosed herein is a computer-implemented system for generating and refining a composite relational entity (CRE) comprising at least one computer processor and instructions executable by the at least one computer processor to provide an application comprising: a data intake module configured to: obtain two or more entity profiles, and assign, for each entity profile, a trust coefficient and governance metadata; a relational synthesis engine comprising one or more model parameters, the relational synthesis engine configured to: generate a CRE from the two or more entity profiles, wherein the CRE comprises a persistent identifier, the governance metadata, the trust coefficients, an interpretability vector, and a lineage anchor, generate a compatibility score for the CRE, wherein the compatibility score represents compatibility between the two or more entities, compute a residual deviation based on a comparison between the compatibility score and feedback related to at least one of the two or more entities, update the one or more model parameters using a governance-weighted update rule; and regenerate the CRE using the one or more updated model parameters upon successful validation of the persistent identifier and lineage anchor; and a validation module configured to validate the persistent identifier and lineage anchor. In some embodiments, the at least one computer processor comprises a secure execution enclave. In some embodiments, the secure execution enclave is a trusted execution environment (TEE). In some embodiments, at least the regeneration is executed within the secure execution enclave. In some embodiments, the validation module is configured to verify one or more cryptographic signatures associated with the lineage anchor. In some embodiments, the relational synthesis engine is configured to recalculates the interpretability vector during regeneration. In some embodiments, the validation module is configured to output a rejection state when lineage anchor validation fails.

Disclosed herein is a non-transitory computer-readable medium storing instructions that, when executed by one or more computer processors, cause the one or more computer processors to perform the method comprising obtaining two or more entity profiles; assigning, for each entity profile, a trust coefficient and governance metadata; generating, by a relational synthesis engine comprising one or more model parameters, a CRE using the two or more entity profiles, wherein the CRE comprises: a persistent identifier, the governance metadata; the trust coefficients; an interpretability vector; and a lineage anchor referencing a prior CRE state; wherein the persistent identifier, the governance metadata, the trust coefficients, the interpretability vector, and the lineage anchor are inseparable structural components of the CRE; generating a compatibility score for the CRE, wherein the compatibility score represents compatibility between the two or more entities; capturing observed feedback associated with at least one of the two or more entities; computing a residual deviation between the compatibility score and the feedback; updating the one or more model parameters using a governance-weighted update rule that modulates the residual deviation based on the trust coefficients and governance metadata; and regenerating the CRE using the updated one or more model parameters only after validation of the persistent identifier and lineage anchor. In some embodiments, the instructions further cause the one or more computer processors to enforce metadata inseparability. In some embodiments, the instructions further cause the one or more processors to validate the lineage anchors prior to regenerating the CRE. In some embodiments, the instructions further cause the one or more processors to recalculate an audit signature after regenerating the CRE.

Disclosed herein is a computer-implemented method for generating and refining domain-specific composite relational entities (CREs) executed at one or more computer processors, wherein the one or more computer processors are configured to execute operations comprising: generating domain-specific CREs using a plurality of relational synthesis engines, each configured for a respective domain, comprising one or more model parameters, and configured to generate CREs comprising a persistent identifier, governance metadata, trust coefficients, and lineage anchors; and updating the one or more model parameters of the plurality of relational synthesis engines using a governance-weighted update rule. In some embodiments, each domain-specific CRE comprises a domain identifiers restricting cross-domain reuse. In some embodiments, updating the one or more model parameters comprises using domain-specific feedback. In some embodiments, each domain-specific relational synthesis engines maintains isolated parameter sets, and cross-domain coordination occurs only through governance-gated operations performed by a separate coordination architecture. In some embodiments, updating parameter values for one domain is restricted unless a domain-continuity rule is satisfied.

Disclosed herein is a computer-implemented method for generating and refining a composite relational entity (CRE), comprising: obtaining two or more entity profiles; assigning, for each entity profile, a trust coefficient and governance metadata; generating, by a relational synthesis engine comprising one or more model parameters, a composite relational entity (CRE) comprising a persistent identifier, governance metadata, trust coefficients, an interpretability vector, and a lineage anchor referencing a prior CRE state, wherein the persistent identifier, governance metadata, trust coefficients, interpretability vector, and lineage anchor are inseparable structural components of the CRE; generating a compatibility score for the CRE; capturing observed feedback associated with the entities; computing a residual deviation between the compatibility score and the observed feedback; and updating the one or more model parameters using a governance-weighted update rule that modulates the residual deviation based on the trust coefficients and governance metadata; regenerating the CRE using the updated model parameters only after validation of the persistent identifier and the lineage anchor. In some embodiments, the lineage anchor comprises a timestamp, hash, or cryptographic marker referencing a prior CRE state. In some embodiments, regenerating the CRE comprises validating an audit signature tied to the persistent identifier and the lineage anchor. In some embodiments, regeneration is rejected when the lineage anchor fails continuity validation. In some embodiments, the CRE is structurally non-substitutable with embeddings, weighted attribute vectors, or similarity metrics. In some embodiments, entity profiles comprise normalized multi-attribute vectors. In some embodiments, the trust coefficients are computed based on historical consistency of the entity profiles. In some embodiments, the governance metadata comprises a governance weight applied during parameter updating. In some embodiments, the interpretability vector comprises sensitivities of the compatibility score to underlying attributes. In some embodiments, updating comprises applying a learning-rate coefficient modulated by governance metadata. In some embodiments, capturing feedback comprises recording behavioral outcomes through an interactive interface. In some embodiments, regeneration occurs within a trusted execution environment. In some embodiments, metadata inseparability is enforced by embedding metadata directly into a latent structure of the CRE. In some embodiments, the method further comprises verifying an audit token prior to regeneration. In some embodiments, the residual deviation is temporally weighted.

Disclosed herein is a computer-implemented system comprising: a data-intake module configured to obtain entity profiles and generate trust coefficients and governance metadata; a relational synthesis engine comprising model parameters and configured to generate a CRE comprising a persistent identifier, governance metadata, trust coefficients, an interpretability vector, and a lineage anchor, generate a compatibility score, compute a residual deviation based on observed feedback, and update the model parameters using a governance-weighted update rule; a validation module configured to verify the persistent identifier and the lineage anchor prior to CRE regeneration; and a secure execution enclave configured to regenerate the CRE only after validation. In some embodiments, the secure execution enclave is a trusted execution environment. In some embodiments, the validation module verifies cryptographic signatures associated with the lineage anchor. In some embodiments, regeneration is blocked when governance metadata fails validation. In some embodiments, the relational synthesis engine recalculates the interpretability vector during regeneration. In some embodiments, the validation module outputs a rejection state when lineage anchor validation fails.

Disclosed herein is a non-transitory computer-readable medium storing instructions that, when executed by one or more computer processors, cause the computer processors to perform processes comprising obtaining two or more entity profiles; assigning, for each entity profile, a trust coefficient and governance metadata; generating, by a relational synthesis engine comprising one or more model parameters, a composite relational entity (CRE) comprising a persistent identifier, governance metadata, trust coefficients, an interpretability vector, and a lineage anchor referencing a prior CRE state, wherein the persistent identifier, governance metadata, trust coefficients, interpretability vector, and lineage anchor are inseparable structural components of the CRE; generating a compatibility score for the CRE; capturing observed feedback associated with the entities; computing a residual deviation between the compatibility score and the observed feedback; and updating the one or more model parameters using a governance-weighted update rule that modulates the residual deviation based on the trust coefficients and governance metadata; regenerating the CRE using the updated model parameters only after validation of the persistent identifier and the lineage anchor. In some embodiments, the instructions cause the system to enforce metadata inseparability. In some embodiments, the instructions cause the system to validate lineage anchors prior to regeneration.

Disclosed herein is a computer-implemented method comprising: generating domain-specific composite relational entities (CREs) using a plurality of relational synthesis engines, each configured for a respective domain and each configured to generate CREs comprising a persistent identifier, governance metadata, trust coefficients, and lineage anchors; and updating model parameters of the plurality of relational synthesis engines using a governance-weighted update rule. In some embodiments, domain-specific CREs include domain identifiers restricting cross-domain reuse. In some embodiments, the domain-specific relational synthesis engines share no parameters unless governance conditions are satisfied. In some embodiments, domain-specific feedback is used during updating of model parameters. In some embodiments, updating parameter values for one domain is restricted unless a domain-continuity rule is satisfied.

Disclosed herein is a computer-implemented method comprising generating a CRE comprising an audit signature tied to a persistent identifier and lineage anchor; comparing a compatibility score with observed outcomes; updating one or more parameters based on a governance-weighted rule; and regenerating the CRE only when an audit signature validation is satisfied.

Conventional distributed learning systems cannot efficiently represent multi-entity relational structure because they rely on derivative embeddings or repeated pairwise comparisons. These approaches require high bandwidth during synchronization, lack persistent relational memory, and provide no native mechanism for governance, auditability, or interpretability within the update loop. The disclosed architecture introduces a new class of computational object, the Composite Relational Entity (CRE), which may possess persistent identity, evolving latent structure, governance metadata, trust coefficients, interpretability signatures, and audit lineage. Locally generated CREs can support efficient relational synthesis within each node of a distributed system, without requiring exchange of raw data or model parameters between nodes. A CRE-based system provides machine-level improvements including reduced bandwidth via CRE delta propagation, persistent composite structures that eliminate repeated recomputation, embedded interpretability vectors, cryptographically verifiable audit metadata, and cross-domain emergent relational behavior. CREs differ fundamentally from embeddings because they exhibit persistent identity, regeneration over time, nested composability, lineage retention, and governance-controlled propagation.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
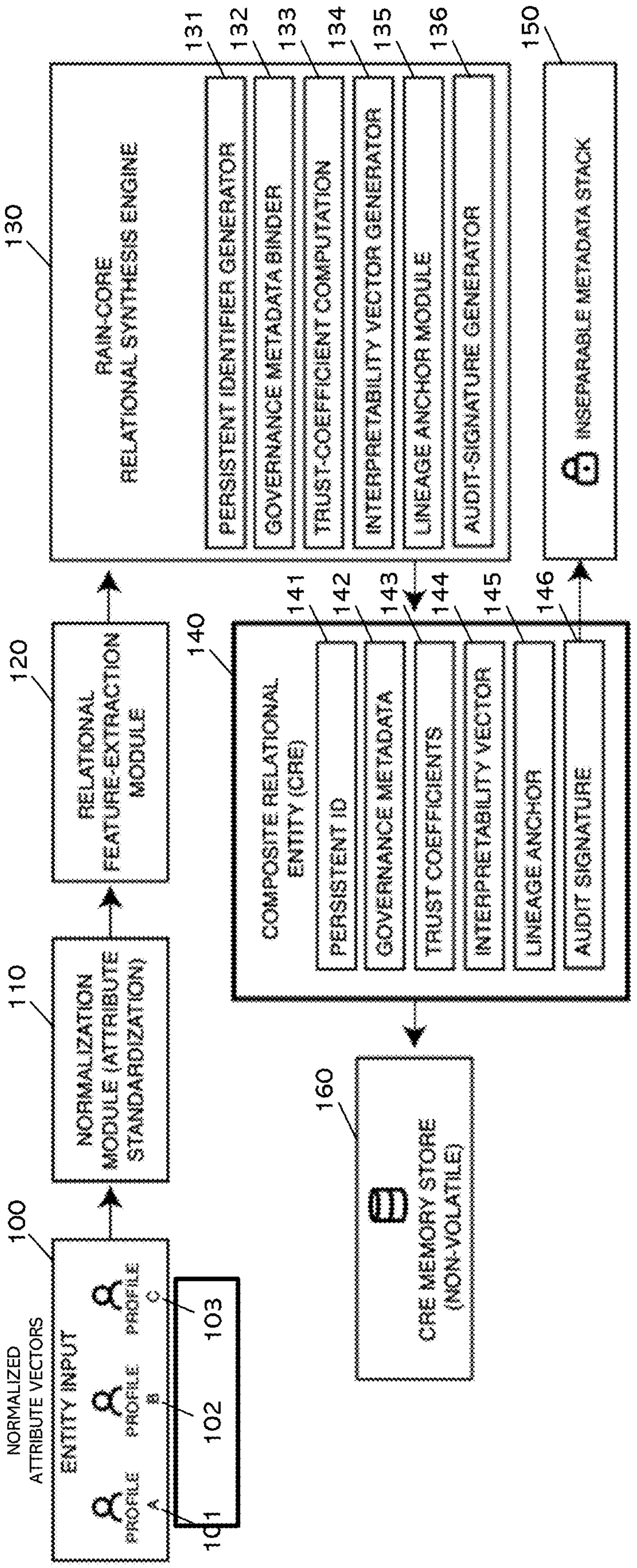
FIG. 1 depicts an example overview of a system architecture including a relational synthesis engine.

Systems, methods, and media described herein may be configured to generate and refine a composite relational entity (CRE). The process may begin with data intake. In some embodiments, the system comprises a data intake module configured to receive data representing entities. The data may be structured or unstructured. This data may be in the form of entity profiles.

In some embodiments, the data may be taken from multiple entities and be used to generate entity profiles corresponding to each entity. In some embodiments, the data intake module is configured receive data representing multiple entities and generate entity profiles corresponding to each entity. Entity profiles may be used to generate a CRE. In some embodiments, entity profiles are processed by a relational synthesis engine to produce a CRE. The relational synthesis engine may comprise one or more parameters (e.g., model parameters) which dictate CRE generation. Each entity profile may comprise attributes representing measurable characteristics or behavioral traits of each entity. These attributes may be normalized. Individual entity profiles may undergo trait extraction and attribute normalization to ensure consistent scaling. This process may convert diverse data types into standardized numerical or categorical feature representations. An example equation of normalization is:

$$A'(i) = (A(i) - \mu_a)/\sigma_a$$

Wherein A(i) is the raw value of the attribute or feature A for entity profile i, $\mu_a$ is the average of the attribute A across all entity profiles, Ga is the standard deviation of the attribute A across all entity profiles, and A'(i) is the normalized value of the attribute A for entity profile i.

The normalized attributes may be assembled into a feature representation for each entity. In some embodiments, each entity profile is first encoded or projected into an entity feature vector, wherein the vector reflects salient attributes of the profile such as reliability indicators, behavioral statistics, governance metadata, or domain-specific capabilities. The mapping from profile attributes to entity vectors may be learned, rule-based, or constrained by governance policies to ensure consistent representational structure across entities. A CRE is a synthesized computation object generated from two or more source entities which in some embodiments possesses a persistent identity, an evolving latent structure, governance metadata, trust coefficients, interpretability signatures, and audit lineage. In some embodiments, CREs are capable of further recompositions into higher-order nested CREs. A CRE is not an aggregated vector or weighted combination of input features, but an independent representational object that may evolve under governance-weighted update rules. In some embodiments, a CRE can include weighted inputs corresponding to the relative contribution of each entity or feature. An example equation is:

$$CRE = \sum_n w_n \cdot x_n$$

Where $x_n$ is the input value for the n-th component and $w_n$ is the weight or coefficient associated with $x_n$.

In some embodiments, a CRE is defined by a learned aggregation function over entity feature vectors. An example equation is:

$$CRE = f(E_1, E_2, \ldots, E_n)$$

Where f denotes a learned aggregation function operating over entity vectors $E_i$.

In some embodiments, other factors may influence the parameters associated with CRE generation. For example, each entity may be scaled by a governance weight. In some embodiments, each entity profile may be assigned a governance weight. In some embodiments, a governance weight may comprise an entity trust coefficient $\tau_i$. Trust coefficients may be assigned to entity profiles according to reliability, interpretability, or compliance with usage policies. In some embodiments, trust coefficients may be assigned based on a historical consistency of the entity profile. For example, an entity whose past outputs consistently align with validated signals may have an entity profile assigned with a higher trust coefficient, whereas an entity exhibiting drift, volatility, or policy-violating behavior may have an entity profile assigned a lower trust coefficient. The assigned governance weights may be used to regulate the influence of entity-vector parameters during CRE instantiation, while the CRE itself remains a persistent machine identity object comprising inseparable governance metadata, lineage anchors, and trust coefficients, which cannot be substituted with embeddings, vectors, or feature tables. The assigned governance weights may be used to regulate the contribution of entity vectors in the formation of the CRE. In some embodiments, the CRE may be associated with an audit token σt verifying authenticity, or a usage rights token $L_t$, or both. The usage rights token may define usage rights, duration, and propagation privileges. An example relational synthesis function used during CRE generation may be expressed as:

$$CRE = f(E_1, E_2, \ldots, E_n) = \left\{\sum_i \tau_i \cdot E_i, \sigma_t, L_t\right\}$$

The CRE produced by the synthesis function is a persistent machine identity object comprising inseparable governance metadata, lineage anchors, and trust coefficients.

Each CRE may be a computational object stored with its own provenance record, interpretability record, or both. Each CRE is a persistent machine identity object comprising inseparable governance metadata, lineage anchors, and trust coefficients, which cannot be substituted with embeddings, vectors, or feature tables. Each CRE may encapsulate the trust-weighted contributions of its constituent entities. In some embodiments, the governance weights associated with entities contributing to a CRE may be further aggregated. In some embodiments, CRE formation requires governance weighting and trust-coefficient modulation. Representative datatypes for non-limiting embodiments of the CRE include: trust coefficient $\tau \in [0,1]$; governance weight $\gamma \in \mathbb{R}^+$; interpretability vector $\psi_k \in \mathbb{R}^n$; audit signature also referred to herein as an audit token $\sigma_t$ encoded as a cryptographic hash; and CRE latent structure represented in $\mathbb{R}^d$ evolving over time.

In some embodiments, governance metadata comprises a structured collection of information that defines how a CRE or entity profile is managed or updated. Governance metadata may include, for example, governance weights and trust coefficients. In some embodiments, governance metadata includes lineage anchors, audit tokens, usage rights, and policy compliance indicators. In some embodiments, governance metadata is used to enforce governance rules. For instance, a governance rule may limit the influence of a low-trust entity in the generation of a CRE. In some embodiments, trust coefficients within the governance metadata quantify the reliability or credibility of each entity profile based on historical consistency, interpretability, or compliance with policies, and these coefficients are used to modulate the impact of an entity's attributes on the CRE during synthesis or updates. In some embodiments, governance metadata is integrated into the latent structure of the CRE.

In some embodiments, a CRE comprises a persistent identifier. The persistent identifier may serve as a unique and stable reference to the CRE throughout its lifecycle. It may enable unambiguous tracking, retrieval and auditing. For example, the identifier may be a globally unique ID. In some embodiments, the persistent identifier may be stored alongside governance metadata, linage anchors, interpretability vectors, and audit tokens. The persistent identifier may also be used to reference the CRE ins downstream process, facilitate recombination into higher-order CREs, or link the CRE to historical versions for provenance and validation purposes. In preferred embodiments, the persistent identifier is inseparably bound to the CRE.

In some embodiments, a CRE comprises governance metadata. Governance metadata may comprise information describing the rules, provenance, and usage rights associated with the CRE. In some embodiments, governance metadata encodes or references governance weights applied to each entity during CRE formation. For example, the governance metadata may reference the trust coefficients and governance weights applied to each entity during CRE formation. In preferred embodiments, governance metadata associated with each CRE may be embedded directly into the CRE latent structure.

In some embodiments, each entity whose features are aggregated into a CRE resides within a secure computational node. Each node may host one or more entity profiles and include a runtime environment encompassing hardware, software, and system state used to manage, process, and communicate the entity profiles. In some embodiments, the system is structured in terms of nodes. Each node may serve as an independent computational unit responsible for managing one or more entity profiles.

In some embodiments, the aggregation function for generating the CRE is kernelized to capture nonlinear relationships among entity features. Example kernel functions include $K(E_i, E_j)=e\hat{}(-\gamma\|E_1-E_j\|^2)$ or $K(E_i, E_j)=(E_i \cdot E_j+c)^p$.

In this example, the aggregation function is kernelized to allow CRE generation process to capture nonlinear relationships among entity vectors. A kernel function, $K(E_i, E_j)$, measures a similarity or interaction strength between two entity representations in a transformed feature space. Example kernels include the radial basis function (RBF) kernel, $K(E_i, E_j)=e\hat{}(-\gamma\|E_i-E_j\|^2)$, which empathizes local relationships by assigning higher weight to entities that are close together, and the polynomial kernel, $K(E_i, E_j)=(E_i \cdot E_j+c)^p$, which can express more complex interaction structures by expanding inner-product relationships.

In some embodiments, the aggregation function introduces trust-weighted coefficients for each entity vector. For example, each entity vector $E_i$ may be associated with a scaling coefficient $w_i$. The scaling coefficient may represent the trustworthiness, reliability, or governance weight assigned to the entity. In some embodiments, the aggregation function may further include adaptive residual terms. These residual terms may capture higher-order relationships among entity vectors, including relationships based on pairwise interactions or contextual interdependencies. For example, a residual term may include a coefficient $\beta_{ij}$ applied to an interaction operator $(E_i \otimes E_j)$, where $\otimes$ denotes a pairwise relational operator. Pairwise relational operators can include but are not limited to vector multiplication, element-wise combination, or tensor composition.

In some embodiments, the aggregation of entity vectors and residual interaction terms may be expressed using an equation representing a composite relational synthesis function. An example of such an equation may be:

$$CRE = \sum_i w_i \cdot E_i + \sum_{ij} \beta_{ij}(E_i \otimes E_j)$$

In this example, the first summation, $\Sigma_i$, represents the weighted contributions of individual entity vectors. The second summation, $\Sigma_{ij}$, represents contributions from pairwise interactions among entity vectors, where $\beta_{ij}$ may be a parameter indicating the magnitude or relevance of the interaction between entities i and j. In some embodiments, both sets of parameters $\{w_i\}$ and $\{\beta_{ij}\}$ may be learned, updated, or constrained according to governance policies, observed outcomes, or domain-specific reliability measures. In some embodiments, additional parameters or terms may be introduced, including audit tokens or other verification indicators. Each resulting CRE may be stored with associated provenance records identifying the contributing entities, trust coefficients, and interaction terms used in the synthesis process. Each CRE comprises governance metadata, such as governance weights, trust-update policies, interpretability signatures, or other control parameters associated with the CRE lifecycle.

In some embodiments, each CRE comprises a lineage anchor. The lineage anchor may reference one or more prior CRE states from which the current CRE was derived. When the CRE is first generated, the lineage anchor may be null, indicating the CRE has no prior state. The lineage anchor may serve as a structural pointer to parent CREs, enabling the system to track the ancestry and evolution of composite entities over time. The lineage anchor may be stored alongside governance metadata, trust coefficients, interpretability vectors, and audit tokens. The lineage anchor may be used during the regeneration, validation, or recombination of the CRE. In some embodiments, the lineage anchor may be associated with a corresponding audit token or cryptographic hash, providing a verifiable record of prior CRE states and relational structures. In some embodiments, the lineage anchor comprises a hash or cryptographic marker referencing a prior CRE state. In some embodiments, the lineage anchor comprises a timestamp referencing a prior CRE state. For example, a lineage anchor may record a timestamp indicating the precise moment at which the prior CRE state was finalized and recorded.

In some embodiments, each CRE may be associated with one or more interpretability vectors. An interpretability vector comprises a set of interpretability metrics, with each metric corresponding to a specific attribute of an entity which the CRE represents. These metrics quantify the relative influence of individual attributes on the composite outcome. For a given attribute $f_k$ in a CRE, an interpretability metric may be calculated. An example equation is:

$$\psi_k = \partial C / \partial f_k$$

Wherein $\psi_k$ is the interpretability metric associated with the attribute $f_k$, and C is the compatibility, prediction, or objective function. Each interpretability metric $\psi_k$ measures the sensitivity of C to changes in $f_k$, providing a gradient-like indication of that attribute's contribution to the composite outcome. Collectively, the set of metrics {ψk} forms an interpretability vector that provides insight into which attributes exert the greatest influence on the CRE. The system may be configured to explain the role of specific features in forming the CRE in human-readable terms. Interpretability vectors may be stored with each CRE alongside governance metadata. The storage of interpretability vectors may enable evaluation, auditing, and explanation of each CRE.

In some embodiments, each CRE may be evaluated. Evaluation of the CRE may be done to generate a compatibility score. The compatibility score may represent a quantitative assessment of the relational state, affinity level, or compatibility condition among the entities contributing to the CRE. Evaluation may be done by a compatibility evaluator. The compatibility evaluator may be a computational component configured to determine a compatibility score associated with a CRE. In some embodiments, the Compatibility Evaluator may compute the compatibility score by examining correlations, interactions, or other relationships among attributes within the CRE.

In some embodiments, the compatibility evaluator may compute a weighted combination of cross-attribute correlations derived from the CRE. For example, the evaluator may analyze feature interactions within the CRE, including interactions that result from the aggregation of entity vectors or from residual pairwise terms present in the CRE. In some embodiments, the evaluator may apply one or more weighting parameters to emphasize or attenuate particular attributes, attribute pairs, or relational signals. The weighting parameters may be learned, static, or determined according to governance-related rules.

In some embodiments, the compatibility score may be computed using a projection function applied to the CRE. The projection function may be linear or may involve a nonlinear mapping such as a kernel-based transformation. The projection function may operate over the feature components of the CRE to produce a scalar score. In some embodiments, the projection function may be parameterized by a weight vector W and an offset term b, which may be trainable or governed by constraints related to interpretability, trust, or usage policies.

In some embodiments, the generation of the compatibility score may be represented by an equation. An example equation for computing a compatibility score Ŝ is shown below:

$$\hat{S} = \sigma(CRE \cdot W + b)$$

In this example, W is a weight vector and the term b represents a bias or offset that may adjust the projection. The term σ is a function. In some embodiments, σ is a bounded activation function, such as a sigmoid, which may be used to map the projected value to a normalized score. In some embodiments, other activation functions may be used, including linear functions, rectified functions, or domain-specific bounded mappings. In some embodiments, W and b may be updated during adaptive feedback cycles based on observed prediction performance or other evaluation criteria.

In some embodiments, the interpretability vector associated with the CRE may be used to explain how individual attributes contributed to the resulting compatibility score. The system may present the compatibility score together with the interpretability vector, enabling users or downstream processes to understand not only the magnitude of the score but the underlying factors driving it.

In some embodiments, compatibility scores may be stored, logged, or retained. The compatibility scores may be monitored for prediction quality. For example, the system may compare compatibility scores generated at different times, under different conditions, or across different engines. Monitoring of the scores may be done to evaluate stability or detect drift. In some embodiments, stored compatibility scores may influence updates to trainable parameters within a relational synthesis engine. In some embodiments, compatibility scores may influence updates to trust coefficients or weigh coefficients associated with contributing entities. In some embodiments, compatibility scores may be associated with an audit token. The audit token may be used to indicate the conditions under which the score was produced.

In some embodiments, CREs may be compared to feedback. Feedback may include observed outcomes, and may be reinforcement based. Feedback may be captured by a feedback module. The feedback may be related to interactions between entities related to the CRE. The feedback module may comprise an interactive interface configured to capture interactions between entities. The interactive interface may comprise an AI concierge configured to elicit interaction from entities. The entities may submit their feedback or it may be captured in other ways. The feedback may capture interaction between entities. For example, a CRE may be generated for two entities and feedback may be captured on the relational interactions between those two entities.

In some embodiments, the feedback may be compared with the generated compatibility score of the CRE.

In some embodiments, the system is configured to minimize prediction loss. The system may minimize prediction loss according to:

$$L = \frac{1}{2}(\text{y\_obs} - \text{y\_pred})^2$$

Wherein L is the prediction loss or error for a single observation, y_obs is the observed value for the target variable, and y_pred is the predicted value produced by the system.

In some embodiments, one or more parameters may be updated based on reinforcement signals. Reinforcement signals may be generated, derived or inferred from observed outcomes. A reinforcement signal may represent positive or negative outcomes corresponding to an output of the system. In some embodiments, one or more parameters may be updated based directly on reinforcement signals. In some embodiments, one or more parameters may be updated indirectly based on reinforcements signals. In some embodiments, the system refines the learning rate of parameters based on reinforcement signals. For instance, positive feedback may increase the learning rate and negative feedback may decrease the learning rate. An example equation could be:

$$\eta'(t) = \eta \cdot (1 + R(t))$$

Wherein n is the base learning rate for parameter updates, $\eta'(t)$ is the reinforcement-modulated learning rate at iteration t, and R(t) is the reinforcement signal at iteration t which represents feedback that modulates the learning rate. The learning rate increases or decreases based on the reinforcement signal. In some embodiments, one or more parameters may be updated based on the reinforcement signal.

In some embodiments, the parameters may be directly updated. Updates to these parameters may be done through a specific equation. In some embodiments, a parameter may be updated using a learning rate, a governance weight, an interpretability metric, or any combination thereof. An example equation could be:

$$W_{t+1} = W_t + \eta \cdot \tau \cdot \psi_k,$$

Wherein, $W_t$ is the parameter at iteration t, $W_{t+1}$ is the updated parameter, n is the learning rate, $\tau$ is a governance weight, and $\psi_k$ is an interpretability vector. The governance weight may be a composite governance weight aggregated from entity level trust coefficients and/or node-level trust coefficients.

In some embodiments, the system is configured to update parameters directly based on feedback. In some embodiments, the system is configured to update parameters based on a learning rate. In some embodiments, the system is configured to update parameters based at least in part on a governance weight. In some embodiments, the system is configured to update parameters based at least in part on a composite governance weight. In some embodiments, the system is configured to update parameters based at least in part on an interpretability metric. In some embodiments, the system is configured to update parameters based at least in part on one or more reinforcement signals.

In some embodiments, comparing the outcomes related to a CRE and the generated compatibility score of the CRE comprises generating a residual deviation representing the differences between the generated compatibility score and the observed outcome. The residual deviation may be positive, negative, or zero depending on whether the predicted compatibility overestimates, underestimates, or aligns with observed behavior. In some embodiments, the residual deviation may be used as a signal indicating how the system should adjust one or more synthesis parameters to improve predictive accuracy. In some embodiments, the residual derivation may be used to update one or more parameters of the relational synthesis engine. In some embodiments, an update routine for adjusting a parameter set may be expressed using an equation. An example equation is:

$$\Theta(t+1) = \Theta(t) + \eta \cdot \nabla \Theta L(\Delta_{(ij)})$$

In this example, Θ(t) represents the current value of the parameter set at time t, and Θ(t+1) represents the updated parameter set. The term n denotes a learning-rate coefficient, which may be fixed, dynamically adjusted, or governed by domain-specific rules. The term L represents a loss function, and ∇ΘL is a gradient of the loss function. In some embodiments, different loss functions may be used depending on domain requirements. $\Delta_{(ij)}$ is a residual deviation and represents the discrepancy between the predicted score and the corresponding observed outcome for entities i and j.

In some embodiments, the system may modulate the residual deviation before applying it in the update rule. For example, the residual deviation may be modulated based on trust coefficients. In some embodiments, the system may compute a trust-weighted residual deviation. An example could be:

$$R'(t) = \sum_k \tau\_\text{trust}(i_k, j_k) \cdot [\text{S\_obs}(i_k, j_k) - \text{S\_pred}(i_k, j_k)]$$

In this example, $\text{S\_obs}(i_k, j_k)$ represents the observed outcome associated with the relational pair $(i_k, j_k)$, and $\text{S\_pred}(i_k, j_k)$ represents the predicted compatibility score for the same pair. The difference between these values represents a residual deviation, and the corresponding trust coefficient $\tau\_\text{trust}(i_k, j_k)$ scales this deviation. In some embodiments, the updated residual R'(t) may serve as an input to the gradient-based update routine described herein.

In some embodiments, the system may modulate the residual deviation using governance metadata, such as policy compliance indicators, provenance weights, or role-specific trust coefficients. A governance weighted residual deviation by be computed by applying one or more governance weights in addition to, or in place of, trust coefficients. In some embodiments, the governance-weighted residual deviation may be supplied to the update rule. The resulting parameter adjustments may then reflect both the feedback and any governance-based modulation.

In some embodiments, the system may apply differential-privacy techniques during parameter updates. For example, noise may be injected into parameter gradients, residual deviations, or other update values to reduce the likelihood that any individual entity can be determined from these metrics. In some embodiments, the magnitude of the injected noise may be varied according to one or more inputs. In some embodiments, the distribution of the injected noise may be varied according to one or more inputs. In some embodiments, the magnitude or distribution of the injected noise may be varied according to privacy policies, trust coefficients, or domain-specific requirements.

In some embodiments, trust coefficients may be incorporated into the feedback process to adjust the influence of each observed residual deviation on subsequent parameter updates. In some embodiments, trust coefficients may be generated for each measured observation. In some embodiment, trust coefficients may be generated for each entity profile, associated with each entity, or associated with each entity profile and a trust coefficient generated or associated with an entity profile may carry over to each measured observation sourced from the entity associated with the entity profile. For example, observations considered reliable, may receive high trust coefficients, while observations considered less reliable may receive lower trust coefficients. Reliability may be determined by whether the observation comprises a verified provenance, whether the observation is consistent with historical behavior, or whether the observation comprises an authenticated audit token. In some embodiments, trust coefficients may dampen or enhance the contribution of observations to parameter updates.

In some embodiments, the system continuously refines CREs through an adaptive feedback loop, which updates weights and parameters of the aggregating functions used in the creation of the CREs according to observed outcomes using gradient-based learning. Observed outcomes may include performance metrics, relational comparisons, or external feedback signals. An example equation for updating trainable parameters is:

$$W(t+1)+W(t)+\eta\cdot\nabla C_{ij}$$

Where W represents trainable parameters, $\eta$ is a learning-rate coefficient, and $\nabla C_{ij}$ is the gradient of a compatibility objective. The trainable parameters may include governance weights or other learned scaling factors in f.

In some embodiments, updates to trainable parameters or aggregation weights within the CRE generation process may be governed by a trust or governance layer. In some embodiments, the influence of each entity's contribution to updates to the parameters or aggregation weights is weighted according to reliability, interpretability, or compliance with usage policies. In some embodiments, the entity-level governance weights may be aggregated into a composite governance weight t. In some embodiments, the trust coefficients from each entity contributing to a CRE may be aggregated to form a CRE trust coefficient. In some embodiments, a trust coefficient vector may be generated comprising the trust coefficients of all constituent entities. In some embodiments, each node is assigned a node-level trust coefficient. In some embodiments, the node-level trust coefficient is aggregated into the composite governance weight $\tau$. In some embodiments, the CRE itself is associated with an audit token $\sigma_t$, which reflects the authenticity or compliance of the CRE's weighted contribution. The composite governance weight may impact updates to trainable parameters or governance weights. In some embodiments, updates further require the presence of an audit token associated with the CRE contributing to the update. For example, a proposed update to a trainable parameter $\Delta\Theta_t$ may be scaled by a composite governance weight $\tau$ and verified using an audit token $\sigma_t$, as in:

$$\Delta\Theta_t=\tau_i\cdot\sigma_t\cdot\Delta\Theta_0.$$

Wherein $\Delta\Theta_0$ represent the initial or unscaled parameter update derived from observed outcomes, $\tau_i$ is a governance weight reflecting the trust, authority, or reliability of the associated entity or component, and $\sigma_t$ is an audit token verifying authenticity. The governance layer may dynamically adjust $\tau_i$ based on observed performance, interpretability metrics, or usage token compliance. In some embodiments, entities lacking valid attestation or licensing may be automatically excluded from contributing to the update. In some embodiments, a CRE cannot exist or influence other CREs or nodes without governance metadata, trust coefficients, and audit lineage, which are integral to the structural definition of the CRE.

In some embodiments, the weighting process employs hierarchical attribute weighting, wherein weights are organized across multiple levels of granularity. For example, higher level weights may correspond to entity or domain-level attributes, while lower-level weights correspond to feature-specific or interaction-specific attributes. Such hierarchical weighting can be applied both to the aggregation of entities in a CRE and to the refinement of trainable parameters.

As parameters update over time, CREs may be re-generated to reflect updated relational structure. This can include parameter updates based on feedback and parameter updates sourced from other engines specific to other domains. The relational synthesis engine may be configured to re-generate the CRE.

In some embodiments, one or more components of a CRE may be validated. In some embodiments, the system may comprise a validation module configured to validate one or more components of a CRE. In some embodiments, validation of one or more components must be completed prior to CRE regeneration. For instance, the one or more components of a CRE must be successfully validated before the CRE is regenerated. The one or more components may include the persistent identifier, the lineage anchor, an audit token, or a usage token. In some embodiments, a CRE is regenerated only after validation of the persistent identifier of the CRE and the lineage anchor of the CRE. In some embodiments, a CRE is regenerated only after successful validation of the persistent identifier and the lineage anchor. This validation may be done by the validation module. In some embodiments, the validation module is configured to verify one or more cryptographic signatures associated with the lineage anchor. In some embodiments, the validation module is configured to output a rejection state upon failure of validation of one or more components of the CRE. In some embodiments, the validation module is configured to output a rejection state upon failure of validation of the lineage anchor of a CRE.

The system may comprise an Interpretability Layer, which may be configured to provide human-readable explanations of compatibility factors. The output of the process is a dynamically updated composite relational output.

In some embodiments, CREs are composable and two or more CREs may be combined to synthesize a new governed composite. The resulting composite can be configured to maintain full provenance of all underlying governance weights and governance tokens, including audit and usage token information. In some embodiments, each newly synthesized CRE inherits governance metadata from its constituent CREs. This may create a chain of reasoning which can be reviewed. In some embodiments, the system is configured to track, evaluate, and explain interactions across multiple levels of aggregation. The system may be configured to track interactions without compromising transparency or governance integrity. In some embodiments, the relation comparison engine is configured to generate the new governed composite. In some embodiments, the system is configured to recombine existing CREs into higher-order nested CRE structures ('composites of composites') to model group-level relational dynamics.

In some embodiments, each CRE is specific to a domain. In some embodiments, each CRE comprises domain-bound propagation constraints, also referred to herein as domain identifiers. These domain identifiers may define the scope in which the CRE can influence other CREs, entity profiles, or system outputs. These constraints may be based on factors such as organizational boundaries, regulatory requirements, functional groupings, geographic regions, or other contextual domains. In some embodiments, the domain-bound propagation constraints are integral structural components of the CRE and cannot be separated from it. In operation, the constraints may control whether adjustments derived from a CRE, such as parameter updates, governance-weighted modifications, or interpretability-guided refinements, are applied to other entities or CREs outside the defined domain. For example, a CRE generated from a set of entity profiles may only influence parameter updates in models associated with the same organizational unit, network node, or regulated environment. In some embodiments, the system may comprise multiple domain-specific engine, each engine configured to generate domain-specific CREs. Each domain-specific engine may comprise model parameters specific to its respective domain.

In some embodiments, domain-specific feedback may be used to update one or more parameters of CRE generation. Such feedback can be derived from interactions between entities within the defined domain. These parameter updates may be applied selectively, ensuring the adjustments only apply to the relevant domain.

In some embodiments, each domain-specific relational synthesis engine maintains a separate set of parameters that govern its operations and CRE generation. Updates to these parameters may be localized within the engine and may not directly shared with other engines. In some embodiments, the system comprises a separate coordination architecture that controls cross domain interaction. In some embodiments, cross-domain interactions occur exclusively through a coordination architecture that applies governance-gated operations.

In some embodiments, a CRE may be regenerated using updated parameters. In some embodiments, parameter updates or CRE regeneration may reference the lineage anchor to ensure consistency with prior CRE states and maintain structural provenance across iterative updates. In some embodiments, regenerated CREs may be produced by applying the updated parameter set to the underlying relational synthesis engine, such that the compatibility scores, entity associations, and relational structures of the CRE reflect the most recent feedback, trust coefficients, governance weights, or other update signals. In some embodiments, the regeneration process may recompute one or more components of the CRE. In some embodiments, the regenerated CRE may comprise the persistent identifier of the original CRE.

In some embodiments, the system comprises an adaptive memory. The adaptive memory may store past information and gradually decrease the impact of older information as new information is added. The adaptive memory may influence updates to parameters by providing historical context which impacts the adjustment of the parameters. In some embodiments, one or more parameters are updated in consideration of the adaptive memory. In some embodiments, adaptive memory is achieved through:

$$M(t) = \beta M(t-1) + (1-\beta)\theta(t)$$

Wherein M(t) is the adaptive memory at iteration t, M(t−1) is the adaptive memory from the previous iteration, θ(t) is the current model parameter set being incorporated into memory, and β is the temporal decay factor controlling the weight of the historical memory vs the current information.

In some embodiments, the system comprises a feedback module configured to capture feedback. This feedback module may be configured to capture all feedback relevant to any domain. It may then be configured to make parameter adjustments to the parameters of domain specific relational synthesis engines based on the feedback relevant to the domain of the domain specific relational synthesis engine. In some embodiments, each domain specific engine comprises a feedback module configured to capture feedback specific to that domain. The domain specific feedback module may then update parameters of the domain specific relational synthesis engine based on the domain specific feedback. In some embodiments, nested CREs may be formed from the outputs of multiple domain engines, creating higher-order relational structures that exhibit emergent behaviors not present in the constituent entities. The lineage of CREs may propagate forward, such that prior CREs inform and shape the creation, weighting, and integration of subsequent CREs across the distributed network.

External data sources, such as behavioral analytics, contextual sensors, or user-generated content, or any combination thereof, may feed into the feedback module.

In some embodiments, entity profiles may be collected through a relational insight matrix (RIM), which captures inputs from the entities. Such input data could include psychometric and behavioral descriptors for each entity. Collection of entity profiles may be performed via a data intake module, also referred to herein as a data intake interface. In some embodiments, information for the entity profiles is collected through an AI interface. The AI interface may be configured to generate entity profiles from information from each participant and transfer the entity profiles to the RIM. These profiles may then be processed by a relational synthesis engine that forms a CRE representing the compatibility signature of two or more entity profiles. In some embodiments, the system comprises a relation comparison engine repository configured to store one or more CREs. In some embodiments, the system comprises a feedback module. The feedback module may comprise an AI interface configured to serve as both a data-collection and interpretability layer, interacting with entities or users, gathering conversational feedback, and transmitting results for adaptive refinement. In some embodiments, the feedback module is configured to update one or more parameters of a relational synthesis engine based on the feedback. In some embodiments, the feedback module comprises a model repository configured to store updated weights, and feedback history. The feedback module may be configured to access the information stored in the model repository and this information may influence future parameter updates. The model repository may be configured to hold historical data, adaptive weights, and feedback histories for longitudinal consistency.

In some embodiments, an interface is configured to prompt entities to input information. This information may be used to create an entity profile for that entity. The entity profile may be used to generate a CRE as described herein. Prompting entities to input information may comprise providing one or more questions to an entity and recording one or more answers to the one or more questions. In some embodiments, the interface is implemented as an AI interface, such as a conversational or generative AI system, configured to elicit information from entities. Eliciting information may be done through interactive dialogue.

In some embodiments, feedback may be collected via an interface. This feedback may be informative on the compatibility of different entities. This feedback may be collected from individual entities. The interface may be the same interface as the interface which prompt entities to input information. In some embodiments, the interface is an AI interface configured to elicit feedback from entities. The AI interface may be a conversational or generative AI system and may collect feedback through interactive dialogue.

An example system flow may include:

1. receiving entity inputs;
2. generating a CRE using parameters;
3. applying governance weighting to the parameters used for CRE generation;
4. applying trust-coefficient modulation to the parameters used for CRE generation;
5. generating nested CREs with parameters;
6. evaluating compatibility;
7. capturing feedback;
8. generating updated parameters;
9. regenerating CREs using the updated parameters; and
10. validating, within a trusted execution environment (TEE), usage tokens or audit tokens before accepting or distributing CREs or parameter updates.

In some embodiments, each CRE comprises a cryptographic signature. In some embodiments, the persistent identifier of the CRE comprises the cryptographic signature. In some embodiments, the lineage anchor of the CRE comprises the cryptographic signature. In some embodiments, the audit token of the CRE is associated with the cryptographic signature. Each cryptographic signature may be generated by an originating node. In some embodiments, the system comprises a receiving module configured to verify the validity of the cryptographic signature. In some embodiments, the system comprises a validation module configured to verify the validity of the cryptographic signature. If the signature is validated, the receiving module will accept or integrate the CRE. Verification may further include non-reusable cryptographic nonces and timestamp validation. In some embodiments, one or more audit tokens are generated as a function of current parameters, parameter change, and a trust coefficient and assigned to a CRE. The trust coefficient may be a composite representation of entity level trust coefficients/governance weights. The audit token may be necessary for a CRE to be verified and contribute parameter updates. If a CRE fails verification it may be automatically rejected and recorded in an audit ledger.

In some embodiments, each entity in the system operates through a secure computational node, which hosts one or more entity profiles. In some embodiments, each node comprises a runtime environment which encompasses the hardware, software, and system state used to manage and process the entity profiles. In some embodiments, each node may be cryptographically bound, tying the runtime environment to the identity of the entity. Before any CRE propagation or parameter update occurs, the system may be configured to verify the integrity of the node and its runtime environment through one or more attestation procedures. If the one or more attestation procedures fails, propagation of CREs or parameter updates from that node may be automatically halted. In some embodiments, the system may be configured to automatically suspend the node if unlicensed execution, alteration of the computational environment, or unauthorized access is detected.

In some embodiments, each entity in the system operates thought a node and each node operates through Software Development Kit (SDK). The SDK may be configured to check the identity and permissions of each node. In some embodiments, the SDK is bound to a Trusted Platform Module (TPM), a secure hardware component which can verify the node's identity and generate an attestation report. In some embodiments, each node transmits an attestation report to an authorized server for verification. Upon successful verification, the authorized server may issue a renewable usage token for that node. The usage token may be bound to a credential of the node or a public key associated with the node. In some embodiments, each CRE or parameter update transmitted by a node may include the usage token for that node and a corresponding cryptographic signature. In some embodiments, a module receiving the CRE may be configured to verify the usage token and the cryptographic signature prior to accepting or integrating the CRE. In some embodiments, if the usage token is absent, invalid, expired, or if the attestation fails, the system may be configured to automatically reject the CRE or parameter update.

In some embodiments, each CRE carries one or more embedded low-amplitude perturbation patterns or watermarks distributed across latent vectors. In some embodiments, each parameter delta carries one or more embedded low-amplitude perturbation patterns or watermarks distributed across latent vectors. The one or more patterns or watermarks may be configured to be imperceptible to normal model operations but detectable via correlation analysis. The system may be configured to use the one or more patterns or watermarks to trace the origin of the CREs and parameter deltas. The system may be configured to identify reused or derivative patterns or watermarks carried by CREs or parameter deltas.

In some embodiments, the system comprises one or more secure models. Latent embedding transformations and incremental updates may be performed within the one or more secure models. Generation of a CRE may be performed within the one or more secure models. In some embodiments, generation of a CRE may be done within a secure execution enclave. In some embodiments, regeneration of a CRE may be done within a secure execution enclave. In some embodiments, all actions of systems of methods described herein may be done within a secure execution enclave. The secure execution enclave may comprise a trusted execution environment (TEE). Each parameter update and CRE generation operation may be confined to a secure execution enclave. In some embodiments, the regeneration of CREs or model parameters is fully executed within a secure execution enclave. Each parameter update may be sealed to an enclave-measurement hash, such that decryption occurs only within allow-listed secure modules. Attempts to access plaintext parameters outside the secure module may trigger automatic quarantine or isolation of the affected node.

In some embodiments, the system may provide each node with locally stored calibration vectors K defining expected parameter or embedding ranges for that node class. Each node may compute a deviation metric $D=\|\Theta\_local-\kappa\|$ to evaluate whether its local parameters remain within expected bounds. If D exceeds a predetermined threshold $\delta$, the system may trigger local recalibration of the node or selectively quarantine the node until compliance is restored. In some embodiments, one or more heartbeat signals may be transmitted periodically to confirm liveness of each node and ensure synchronization continuity; missed heartbeats may automatically initiate temporary isolation of the affected node.

In some embodiments, one or more reference vectors used for internal normalization or stability checking may be maintained locally within each node. Each node may verify, within its secure enclave, that these reference vectors have been applied correctly during CRE generation or regeneration. These modules may conduct the verification with periodic checks confirming adherence to the expected update schedule. In some embodiments, an integrity score may be generated from stability, audit-consistency, and parameter-variance metrics. Each update may include a human-readable rationale vector accompanying the integrity score to support traceable and verifiable computations.

In some embodiments, the system may configure certain nodes to host synthetic CREs or inert relational structures associated with their entity profiles. These synthetic CREs may be used to verify correct handling of CRE generation, regeneration, and update sequencing within a node, and detect anomalous behavior. The system may automatically generate audit entries and alerts if synthetic CREs appear in unauthorized contexts, enabling traceable enforcement of governance rules.

systems, methods, and media described herein incorporate synthetic CREs. The synthetic CREs may contain identifiable but inert relational structures. In some embodiments, the system is configured to validate CRE processing behavior within individual nodes.

In some embodiments, each node of the system may store a usage token $L_r$. The usage token may encode the permissible operations for that node. Permissible operations can include allowed CRE regeneration, CRE generation, parameter updates, usage quota, and duration. In some embodiments, before any CRE generation or regeneration occurs, the system may be configured to validate the usage token $L_r$ within the node's secure runtime environment or trusted execution context. If the usage token is determined to be invalid, generation of CREs or regeneration of CREs from that node may be automatically dropped, and the node may be flagged for review or suspension.

In some embodiments, one or more modules of the system may be configured to monitor specific metrics. Specific metrics may include update frequency, parameter variance, synchronization latency, and embedding drift. In some embodiments, the one or more modules may be configured to trigger automatic verification routines, regeneration of affected CREs, or selective isolation of inconsistent nodes when deviations from expected ranges are observed. In some embodiments, each node may be assigned a node trust coefficient. The node trust coefficient may determine how much each node parameter update or CRE contribution will influence aggregated results.

The system may comprise distinct classifications of nodes. For instance, read-only nodes may be configured to perform inference using CREs without contributing updates. Adaptive nodes may be configured to participate in full CRE exchange and parameter adaptation.

The systems, methods, and media described herein may be applied to a wide range of environments requiring the synthesis, evaluation, or coordination of relational information. Although social-matching and professional-matching applications provide illustrative examples, the systems, methods, and media described herein may be deployed in commercial or operational domains such as supply-chain coordination, logistics planning, vendor-client matching, inventory optimization, and procurement networks. In some embodiments, the systems, methods, and media described herein may be applied to healthcare environments, including triage routing, care-team assignment, therapy-plan matching, or patient-resource coordination. In some embodiments, the systems, methods, and media described herein may support robotics or automation contexts, including human-robot teaming, cooperative-robot task allocation, swarm-robot coordination, or safety-aware interaction planning. In some embodiments, the systems, methods, and media described herein may be utilized in education or training environments, including adaptive learning systems, personalized curriculum sequencing, or student-instructor pairing. In some embodiments, the systems, methods, and media described herein may operate within simulation or computational modeling domains, including multi-agent simulation networks, reinforcement-learning environments, digital-twin ecosystems, or hybrid human-machine decision-support systems. The systems, methods, and media described herein may be applied to any environment in which two or more entities, agents, or resources may be evaluated, coordinated, or synthesized to form relational representations.

Computational Efficiency

Systems, methods, and media disclosed herein generate and utilize composite relational entities (CREs). Each CRE represents the relationships among multiple entities in a single compact form. However, CREs cannot be substituted with embeddings, weighted attribute vectors, or similarity metrics without loss of required identity, governance, and lineage integrity. Importantly, by encoding multi-entity relationships in this manner, the system reduces the amount of computation required, since it is not necessary to perform separate calculations for each group of two or more entities. The CREs also reduce the size of the data that must be transmitted and/or stored, thereby lowering bandwidth and memory requirements. In some embodiments, learning or parameter updates are performed locally within each CRE. In addition, feedback from the system may be applied asynchronously, allowing computations to be performed in parallel and increasing the efficiency of hardware utilization. In some embodiments, this structure supports selective transmission, where only a portion of each CRE's parameters is sent across the network, while the remainder can be reconstructed deterministically at the receiving node.

In some embodiments, systems, methods, and media described herein transmit only the changes or updates to parameters (parameter deltas), rather than transmitting entire datasets when the system performs CRE regeneration. By limiting the communication to deltas, the system reduces the amount of data that must be sent between components, conserving bandwidth. In addition, this approach reduces the computational load on processing units, since less data must be handled and integrated. In some embodiments, the system is configured to combine delta transmission with selective transmission of only certain matrix columns or CRE portions. In some embodiments, the timing of delta transmission may be updated based on system requirements or network conditions, allowing for further optimization of resource usage.

In some embodiments, systems, methods, and media described herein employ structure re-use of latent relational embeddings within each CRE, allowing compatibility computations to be performed in $O(n)$ rather than $O(n^2)$ complexity relative to the number of participating entities. While CREs cannot be substituted with embeddings, weighted attribute vectors, or similarity metrics without loss of required identity, governance, and lineage integrity, such embedding reuse improves runtime scalability and reduces computational overhead within each secure node. In some embodiments, the CREs may be partitioned or clustered according to entity similarity or interaction frequency to optimize memory locality and parallel processing within the same node. Moreover, the re-use of latent relational structures allows incremental updates to propagate within a given CRE, without necessitating full recomputation. In some embodiments, the system may dynamically adjust CRE composition based on locally observed interaction patterns, ensuring that computational resources are allocated efficiently without exchanging CREs, embeddings, or parameters with external nodes.

The embedding of governance and interpretability within the learning process may further improve efficiency. For instance, it can eliminate redundant aggregation, prevent unauthorized updates, and enable selective propagation of parameter changes.

FIG. 1 is a schematic diagram illustrating an example system architecture including an architecture for a relational synthesis engine 130. The system includes input entity profiles 101-103 processed through a normalization module 110 and a relational feature-extraction module 120. A relational synthesis engine executed by one or more processors generates Composite Relational Entities (CREs) 140 comprising inseparable metadata including a persistent identifier 141, governance metadata 142, trust-coefficient vectors, interpretability vectors 144, lineage anchors 145, and audit signatures 146. The CREs are stored in a non-volatile CRE memory store 160. FIG. 1 depicts the deterministic, processor-executed flow from raw inputs to structured CRE generation.

Continuing to refer to FIG. 1, the system described herein may comprises an entity input module 100 configured to collect one or more entity profiles 101-103 corresponding to one or more entities. The one or more entity profiles may comprise one or more attributes of the one or more entities. The entity profiles may then be transferred to a normalization module 110. The normalization module 110 may be configured to normalize the one or more attributes from the one or more entity profiles. Normalization may comprise generating feature vectors for each entity. These normalized attributes may then be transferred to a relational feature-extraction module 120. The relational feature-extraction module 120 may be configured to derive relational features from the normalized attributes. The feature-extraction module 120 may further be configured to encode both individual and inter-entity characteristics into entity feature vectors. The entity feature vectors may then be transferred to the relational synthesis engine 130 for use to generate one or more CREs 140. The relational synthesis engine 130 may comprise a persistent identifier generator 131 configured to generate a persistent identifier for the CRE 140. The relational synthesis engine 130 may comprise a governance metadata binder 132 configured to bind governance metadata to the CRE 140. The governance metadata may be sourced from the entity profiles. The relational synthesis engine 130 may comprise trust coefficient computation 133 configured to compute a CRE trust coefficient or trust coefficient vector which will then be associated with the CRE 140. The CRE trust coefficient or trust coefficient vector may be computed from entity level trust coefficients. The relational synthesis engine 130 may also bind the entity trust coefficients to the CRE 140. The relational synthesis engine 130 may comprise an interpretability vector generator 134 configured to generate an interpretability vector associated with the CRE 140. The interpretability vector may be a vector formed from interpretability metrics associated with each feature of each entity from each entity profile. The relational synthesis engine 130 may comprise a lineage anchor module 135 configured to generate a lineage anchor associated with the CRE 140. In some embodiments, the linage anchor is attached to the CRE 140 and not generated. The lineage anchor my reference a prior CRE state. The relational synthesis engine 130 may comprise an audit signature generator 136 configured to generate an audit signature associated with the CRE 140. After the CRE 140 is generated by the relational synthesis engine 130 the CRE 140 may comprise a persistent ID 141, governance metadata 142, trust coefficients 143, an interpretability vector 144, a lineage anchor 145, and an audit signature 146. The features of the CRE 140 are part of an inseparable metadata stack 150 tied to the CRE 140. After the CRE 140 is generated, it may be stored in a CRE memory store 160. While implemented in machine memory, a CRE is not merely a stored tuple, embedding, or profile; it is a machine-enforced identity construct whose structural metadata is inseparable and required for lifecycle progression.

Figure 2:
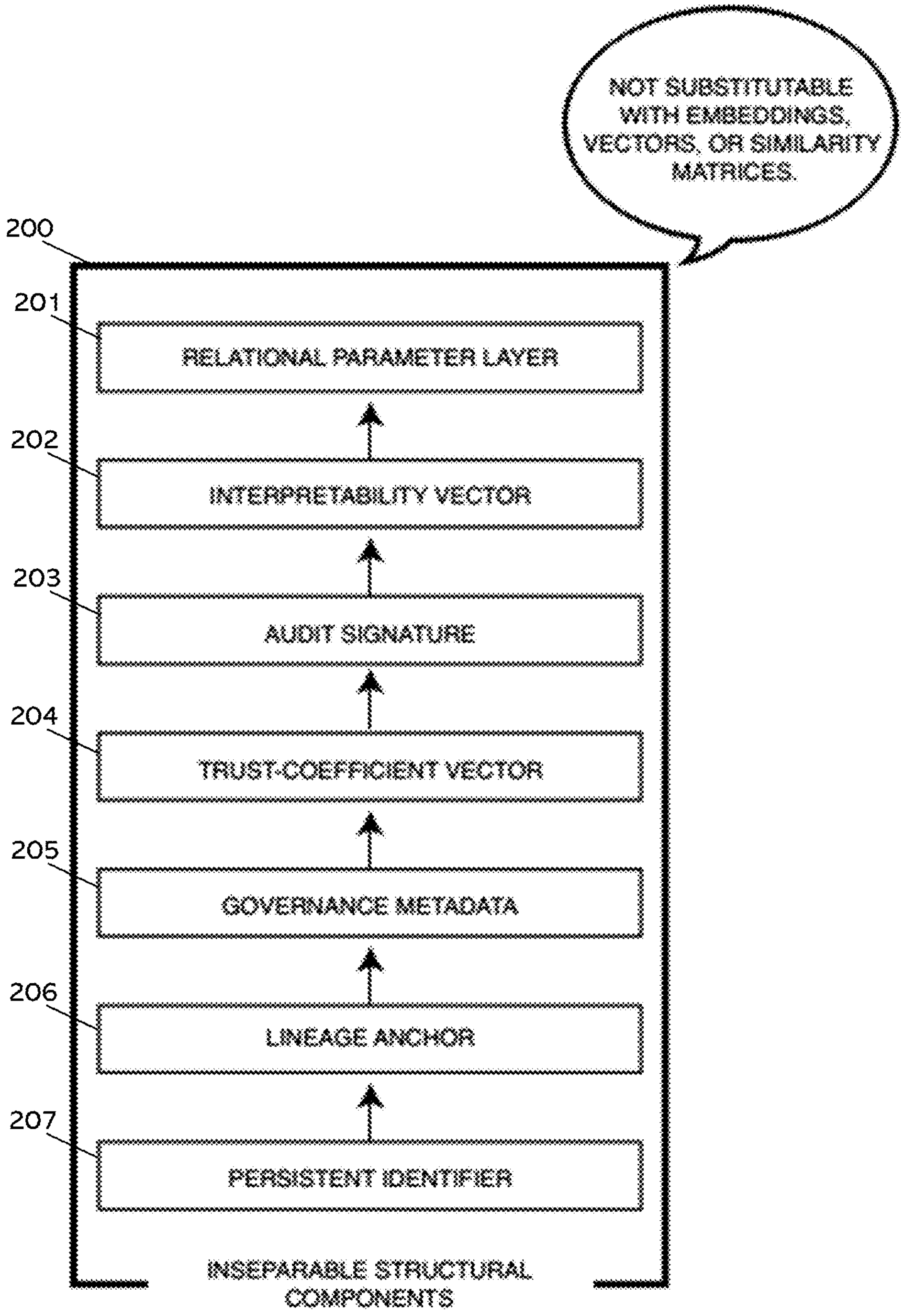
FIG. 2 depicts an example structural representation of a composite relational entity (CRE)

FIG. 2 illustrates an example structural representation of a Composite Relational Entity (CRE) 200. The CRE 200 includes a plurality of inseparably bound metadata layers including a persistent identifier 207, a lineage anchor 206, governance metadata 205, trust-coefficient vectors 204, an audit signature 203, an interpretability vector 202, and relational parameter layers 201. The metadata layers collectively define the required latent structure of the CRE and cannot be removed, substituted, or separated without loss of CRE integrity or computational function. FIG. 2 further distinguishes the CRE from conventional embeddings, weighted vectors, or similarity matrices.

Figure 3:
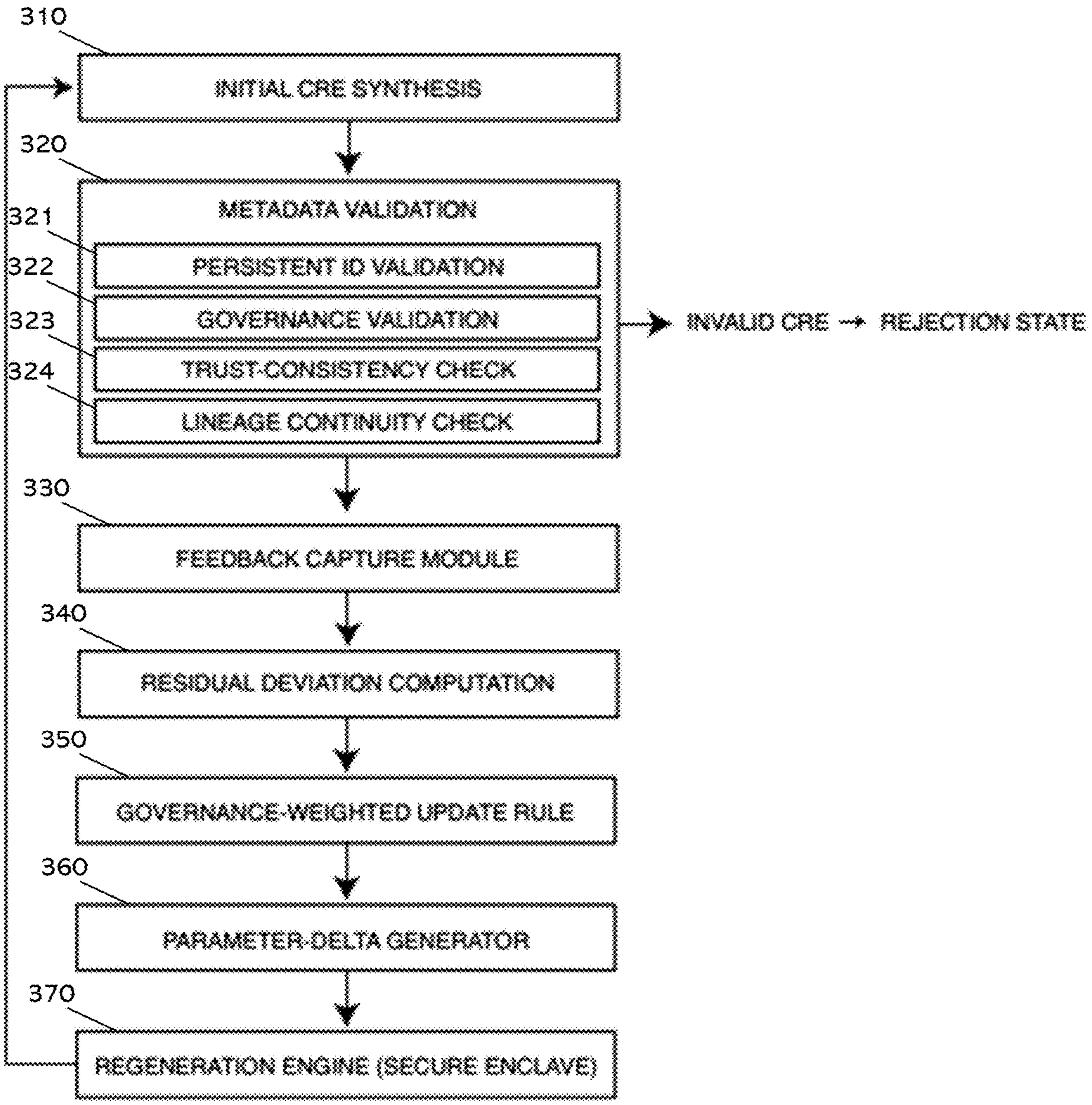
FIG. 3 is a flow diagram illustrating an example lifecycle and regeneration process for a CRE within a system.

FIG. 3 is a flow diagram illustrating an example lifecycle and regeneration process for a CRE within the system. CREs are not value sets or embeddings; they are enforced identity structures whose metadata governs validation, regeneration, and rejection. The process includes initial CRE synthesis 310, metadata validation 320 (including persistent-identifier validation 321, governance validation 322, trust-consistency checks 323, and lineage-continuity checks 324), feedback capture 330, residual-deviation computation 340, governance-weighted update operations 350, parameter-delta generation 360, and CRE regeneration within a secure execution environment 370. CREs that fail metadata validation are directed to a rejection state. FIG. 3 demonstrates that CRE lifecycle refinement is executed through deterministic machine logic.

Continuing to refer to FIG. 3, a CRE may first be generated through initial CRE synthesis 310 and then enter metadata validation 320. Validation may comprise a persistent ID validation 321 of the persistent ID of the CRE, governance validation 322 of the CRE governance metadata, trust-consistency check 323 of trust coefficients or trust vectors associated with the CRE, and lineage continuity check 324 of the CRE lineage anchor. If the CRE does not meet the validation the CRE may be determined to be invalid and may enter a rejection state. In some embodiments, the CRE need only fail one validation check to fail validation. In some embodiments, the CRE need fail two validation checks to fail validation. In some embodiments, the CRE need fail three validation checks to fail validation. In some embodiments, the CRE need fail four validation checks to fail validation. In some embodiments, the CRE need fail all validation checks to fail validation. If the CRE clears validation, a feedback module 330 then may capture feedback. The captured feedback may then be compared to the CRE or a compatibility score generated from the CRE and a residual deviation may be computed 340. After computation of the residual deviation, parameters dictating CRE generation may be updated using a governance-weighted update rule 350. A parameter-delta generator 360 may then generate a parameter delta from the differences between the updated parameters and the original parameters. This parameter delta may then be transferred to a regeneration engine 370 to regenerate the CRE. The regeneration engine may be the same engine which generated the CRE originally or a different engine.

Figure 4:
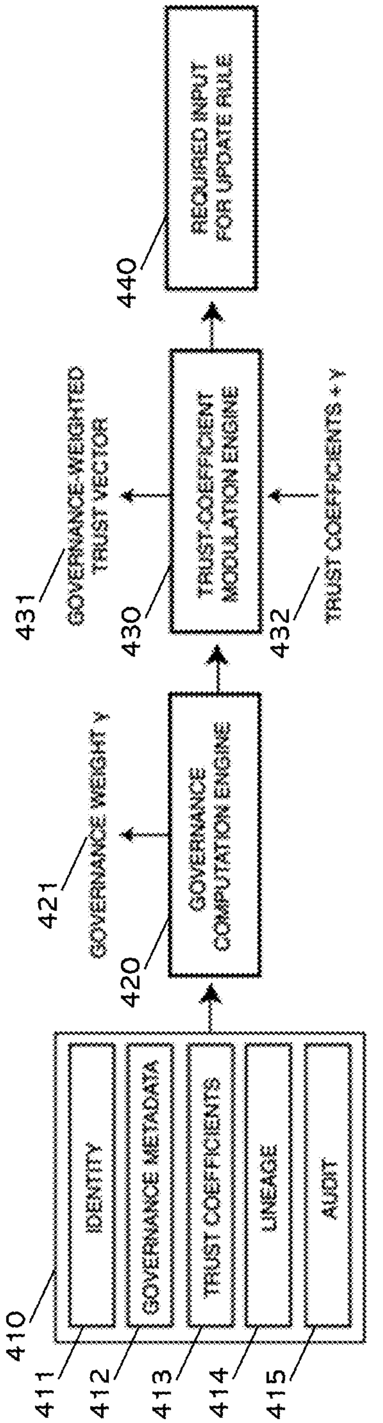
FIG. 4 illustrates an example governance-weight and trust-coefficient computation pipeline.

FIG. 4 illustrates an example governance-weight and trust-coefficient computation pipeline. CRE metadata 410—including identity 411, governance metadata 412, trust coefficients 413, lineage data 414, and audit signatures 415—is processed by a governance-computation engine 420 to compute a governance weight. The governance weight is applied within a trust-coefficient modulation engine 430 to generate governance-weighted trust-coefficient vectors 431. The trust-coefficient modulation engine 430 may also generate trust coefficients with the governance weight 432. These governance-weighted values are provided as required inputs 440 to the update mechanism that adjusts parameters of the relational synthesis engine. FIG. 4 depicts that governance metadata and trust-coefficient computations are non-generic and structurally required for CRE parameter updates. The CRE is structurally distinct from embeddings or metadata-augmented vectors; its metadata is inseparable and required for lifecycle progression.

Figure 5:
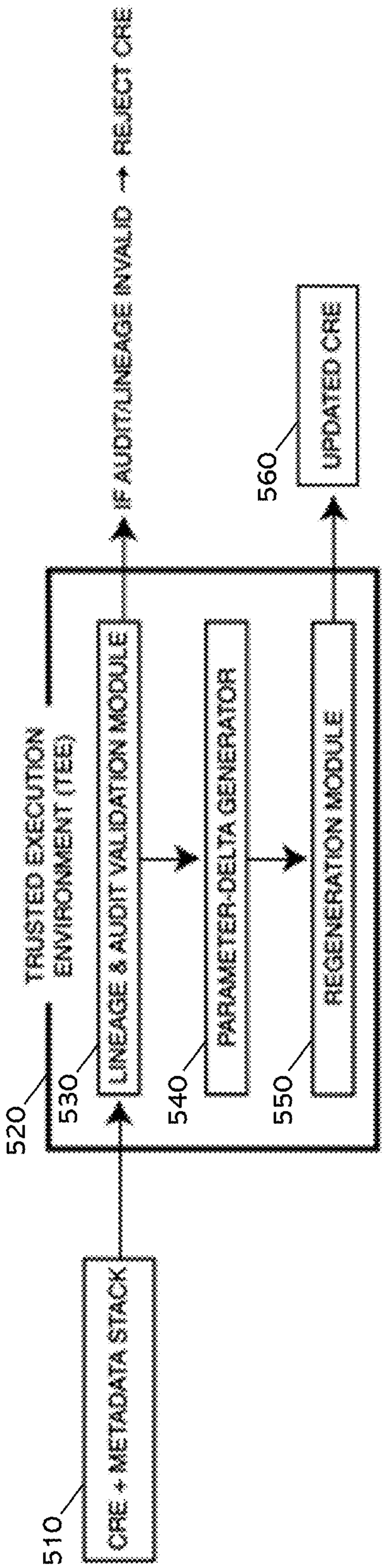
FIG. 5 is a diagram illustrating an example regeneration engine operating within a Trusted Execution Environment (TEE)

FIG. 5 is a diagram illustrating an example regeneration engine operating within a Trusted Execution Environment (TEE). A CRE and its metadata stack 510 are provided to a lineage- and audit-validation module 530. Validation applies to a machine-enforced identity object, not to passive data. If validation succeeds, a parameter-delta generator 540 produces updated parameter values, and a regeneration module 550 generates an updated CRE 560. The parameter-delta generator 540 may generate parameter deltas from updated parameters for CRE generation and the original CRE generation parameters. The regeneration module 550 may be configured to regenerate the CRE 510 using the parameter deltas. If validation fails, the CRE is rejected. FIG. 5 depicts that regeneration occurs only within a secure enclave and only after lineage and audit verification, ensuring integrity and continuity of the CRE lifecycle.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

The terms "entity" or "entities" as used herein can be any natural person, artificial person, organization, or construct. In some embodiments, an entity can include an individual, a corporation, a partnership, a trust, a governmental body, a non-governmental organization, a foundation, an academic institution, or any other public or private institution. A composite relational entity (CRE), as described herein, may be an entity representing an abstraction of two or more underlying entities and their relational attributes.

The term "feedback" as used herein refers to any data, signal, information, or indicator that reflects, represents or is derived from an outcome, response, interaction, or performance. In some embodiments, feedback can include explicit inputs, such as a rating provided directly by an entity. In some embodiments, feedback can include implicit or observed data derived from behaviors, transactions, communications, environmental conditions, or sensor outputs. Feedback may be qualitative or quantitative. In some embodiments, feedback can be automatically generated by a computational process, algorithm, or system. In some embodiments, feedback may be captured in real time, near real time, or asynchronously. Unless otherwise specified, the term "feedback" encompasses any form of information used to inform, train, adjust, evaluate, or refine one or more parameters, models, or processes described herein.

The term "parameter" or "parameters" as used herein refers to any value, variable, weight, coefficient, threshold, vector, setting, or other definable element that influences or determines the behavior, structure, or output of a model, engine, or computational process. In some embodiments, parameters can include numerical values, categorical indicators, probability distributions, or learned representations. Parameters may be static, dynamic, predefined, or adaptively modified over time in response to feedback or other contextual inputs. Unless otherwise indicated, the term "parameter" is intended to be interpreted broadly to include any data element, control value, or learned variable used to configure, calibrate, or influence computational, analytical, or relational modeling operations described herein.

The term "domain" as used herein refers to any definable scope, context, category, or environment in which entities, data, or relational models operate, interact, or are evaluated. In some embodiments, a domain can include a subject-matter area, such as health, finance, professional relationships, transportation, hospitality, social relationships, commerce, or education.

The term "engine" as used herein refers to any computational, logical, algorithmic, or procedural component configured to perform one or more operations, functions, or analyses described herein. The term includes, without limitation, artificial intelligence models, machine learning models, neural networks, statistical models, or any adaptive or rule-based system configured to generate, process, or analyze data. Unless otherwise indicated, the term "engine" encompasses both trained models and dynamically learning systems.

Computing System

Figure 6:
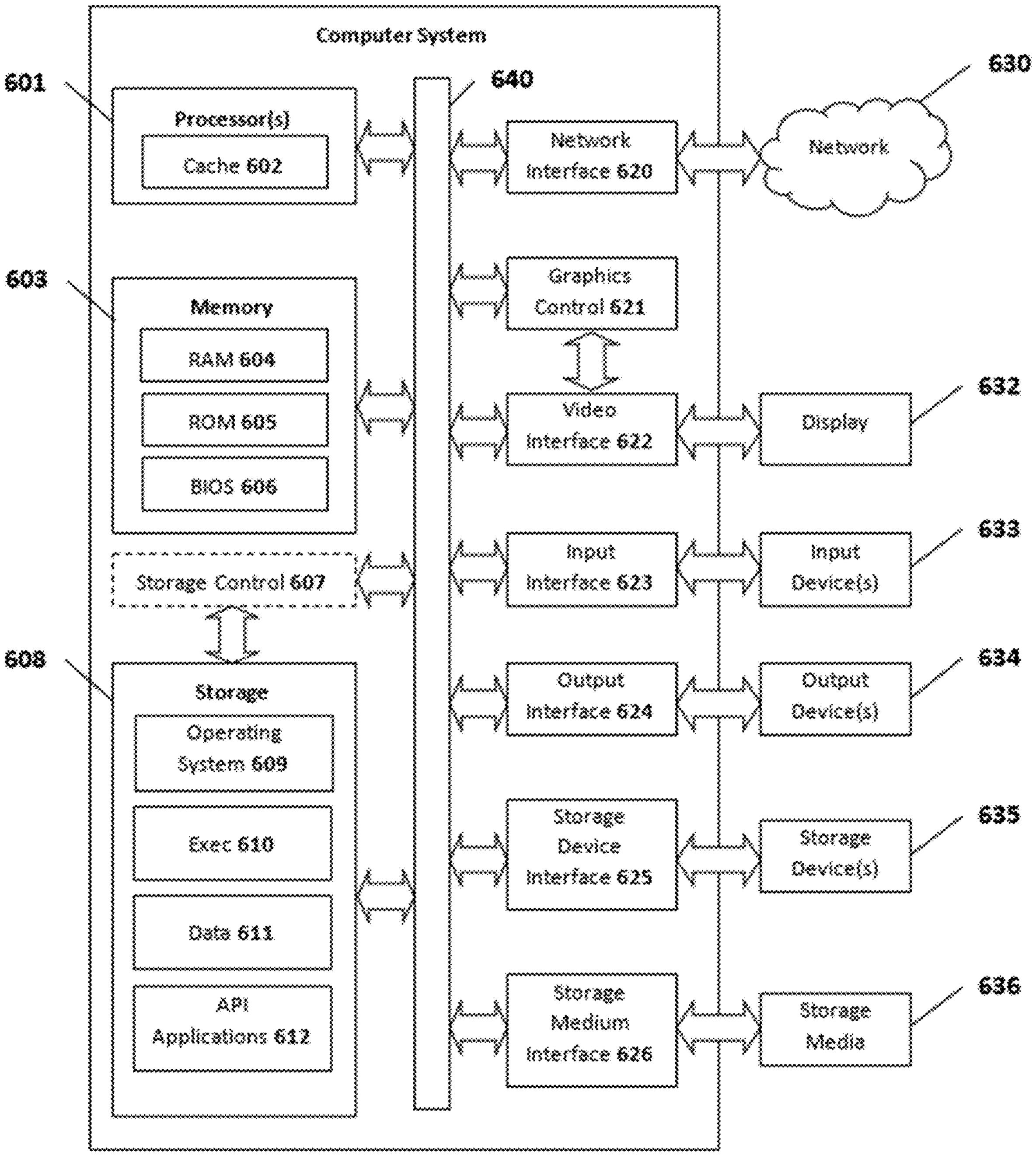
FIG. 6 shows a non-limiting example of a computing device; in this case, a device with one or more processors, memory, storage, and a network interface.

Referring to FIG. 6, a block diagram is shown depicting an exemplary machine that includes a computer system 600 (e.g., a processing or computing system) within which a set of instructions can execute for causing a device to perform or execute any one or more of the aspects and/or methodologies for static code scheduling of the present disclosure. The components in FIG. 6 are examples only and do not limit the scope of use or functionality of any hardware, software, embedded logic component, or a combination of two or more such components implementing particular embodiments.

Computer system 600 may include one or more processors 601, a memory 603, and a storage 608 that communicate with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 600 includes one or more processor(s) 601 (e.g., central processing units (CPUs), general purpose graphics processing units (GPGPUs), or quantum processing units (QPUs)) that carry out functions. Processor(s) 601 optionally contains a cache memory unit 602 for temporary local storage of instructions, data, or computer addresses. Processor(s) 601 are configured to assist in execution of computer readable instructions. Computer system 600 may provide functionality for the components depicted in FIG. 6 as a result of the processor(s) 601 executing non-transitory, processor-executable instructions embodied in one or more tangible computer-readable storage media, such as memory 603, storage 608, storage devices 635, and/or storage medium 636. The computer-readable media may store software that implements particular embodiments, and processor(s) 601 may execute the software. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., static RAM (SRAM), dynamic RAM (DRAM), ferroelectric random access memory (FRAM), phase-change random access memory (PRAM), etc.), a read-only memory component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, executable(s) 610, data 611, applications 612 (application programs), and the like. Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide non-volatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, distributed computing systems, cloud storage systems, cloud computing systems, and the like, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 632, computer system 600 may include one or more other peripheral output devices 634 including, but not limited to, an audio speaker, a printer, a storage device, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, cloud computing platforms, distributed computing platforms, server clusters, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS® Google® Android®, Microsoft® Windows Phone® OS, Microsoft® Windows Mobile® OS, Linux® and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, SonyR PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM Blackberry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of psychometric, behavioral, contextual, relationship, demographic, and observational information. In various embodiments, suitable databases include, by way of non-limiting examples, relational databases, non-relational databases, object oriented databases, object databases, entity-relationship model databases, associative databases, XML databases, document oriented databases, and graph databases.

Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the applications, systems, and methods described herein and are not meant to be limiting in any way.

Example 1—CRE & Compatibility Score Generation

In one illustrative embodiment, the system is configured to facilitate group activity matching. The system receives a plurality of entity profiles corresponding to individual participants who are in relationships and generates CREs by combining the profiles of participants within each group. Each CRE represents a synthesized compatibility profile of the group across multiple attributes relevant to group interactions, such as communication style, activity preferences, and collaborative problem-solving tendencies.

The system may then further generate one or more internal compatibility scores within each CRE, reflecting relational dynamics among the constituent participants. These internal scores may quantify intra-group cohesion, predicted collaboration quality, or expected alignment of preferences among group members. The internal compatibility score is stored as part of the CRE's latent structure.

During the group activity, the system captures feedback from observed interactions among participants within each group, such as cooperative task performance, engagement levels, and satisfaction metrics. After the activity, the system updates one or more model parameters based on this feedback using an adaptive learning mechanism, thereby improving the accuracy of future internal compatibility scores generated within CREs.

Example 2—Cross Domain CREs

In one illustrative embodiment, the system is configured to facilitate both professional and social collaboration matching. The system receives a plurality of entity profiles corresponding to individual participants, where each profile includes professional attributes (e.g., skills, expertise, industry) and social attributes (e.g., interests, hobbies, personality traits).

A relational synthesis engine specific to the social domain generates Composite Relational Entities (CREs) from two or more discrete entity profiles, wherein each CRE represents a synthesized compatibility between the participants based solely on social attributes relevant to group interaction, networking, or recreational collaboration. Additional CREs are generated from other participants.

The social-domain relational synthesis engine generates one or more internal compatibility scores within each social CRE, reflecting social compatibility among the participants that the CRE represents. These internal compatibility scores are stored as part of the CRE's latent structure.

Concurrently, a separate relational synthesis engine specific to the professional domain generates CREs based on professional attributes from the same participants. The separate relational synthesis engine may compute internal professional compatibility scores within each professional CRE.

What is claimed is:

1. A computer-implemented method for generating and refining a composite relational entity (CRE) executed at one or more computer processors, the method comprising:

a) obtaining two or more entity profiles;

b) assigning, for each entity profile, a trust coefficient and governance metadata;

c) generating, by a relational synthesis engine comprising one or more model parameters, a CRE using the two or more entity profiles, wherein the CRE comprises:

i) a persistent identifier;

ii) the governance metadata;

iii) the trust coefficients;

iv) an interpretability vector; and v) a lineage anchor referencing a prior CRE state;

wherein the persistent identifier, the governance metadata, the trust coefficients, the interpretability vector, and the lineage anchor are inseparable structural components of the CRE;

d) generating a compatibility score for the CRE, wherein the compatibility score represents compatibility between the two or more entities;

e) capturing feedback associated with at least one of the two or more entities;

f) computing a residual deviation between the compatibility score and the feedback;

g) updating the one or more model parameters using a governance-weighted update rule that modulates the residual deviation based on the trust coefficients and governance metadata; and h) regenerating the CRE using the updated one or more model parameters only after validation of the persistent identifier and lineage anchor.

2. The method of claim 1, wherein the lineage anchor is null, indicating the CRE has no prior state.

3. The method of claim 1, further comprising validating the persistent identifier and lineage anchor.

4. The method of claim 1, wherein the lineage anchor comprises a timestamp, a hash, or a cryptographic marker referencing the prior CRE state.

5. The method of claim 1, wherein regenerating the CRE comprises validating an audit signature tied to the persistent identifier and the lineage anchor.

6. The method of claim 1, wherein regenerating the CRE is rejected when the lineage anchor fails validation.

7. The method of claim 1, wherein the CRE is structurally non-substitutable with embeddings, weighted attribute vectors, or similarity metrics.

8. The method of claim 1, wherein the one or more entity profiles comprise normalized multi-attribute vectors.

9. The method of claim 1, wherein the trust coefficients are computed based at least in part on a historical consistency of the two or more entity profiles.

10. The method of claim 1, wherein the governance metadata comprises a governance weight applied during the updating the one or more model parameters.

11. The method of claim 1, wherein the persistent identifier is preserved across regenerations of the CRE.

12. The method of claim 1, wherein the interpretability vector comprises sensitivities of the compatibility score to underlying attributes.

13. The method of claim 1, wherein updating the one or more model parameters comprises applying a learning-rate coefficient modulated by the governance metadata.

14. The method of claim 1, wherein capturing the feedback comprises recording behavioral outcomes through an interactive interface.

15. The method of claim 1, wherein regenerating the CRE occurs within a trusted execution environment (TEE).

16. The method of claim 1, further comprising embedding metadata directly into a latent structure of the CRE, thereby enforcing metadata inseparability.

17. The method of claim 1, further comprising verifying an audit token prior to regenerating the CRE.

18. A computer-implemented system for generating and refining a composite relational entity (CRE) comprising at least one computer processor and instructions executable by the at least one computer processor to provide an application comprising:

(a) a data intake module:

i) obtaining two or more entity profiles; and ii) assigning, for each entity profile, a trust coefficient and governance metadata;

(b) a relational synthesis engine comprising one or more model parameters, the relational synthesis engine:

i) generating a CRE from the two or more entity profiles, wherein the CRE comprises a persistent identifier, the governance metadata, the trust coefficients, an interpretability vector, and a lineage anchor;

ii) generating a compatibility score for the CRE, wherein the compatibility score represents compatibility between the two or more entities;

iii) computing a residual deviation based on a comparison between the compatibility score and feedback related to at least one of the two or more entities;

iv) updating the one or more model parameters using a governance-weighted update rule; and v) regenerating the CRE using the one or more updated model parameters upon successful validation of the persistent identifier and lineage anchor; and (c) a validation module validating the persistent identifier and the lineage anchor.

19. The system of claim 18, wherein the at least one computer processor comprises a secure execution enclave, and wherein at least regenerating the CRE is executed within the secure execution enclave.

20. The system of claim 19, wherein the secure execution enclave comprises a trusted execution environment (TEE).

21. The system of claim 18, wherein the validation module verifies one or more cryptographic signatures associated with the lineage anchor.

22. The system of claim 18, wherein the relational synthesis engine recalculates the interpretability vector during regeneration.

23. A non-transitory computer-readable medium storing instructions that, when executed by one or more computer processors, cause the one or more computer processors to perform the method of claim 1.

24. The computer-readable medium of claim 23, wherein the instructions further cause the one or more computer processors to enforce metadata inseparability.

25. The computer-readable medium of claim 23, wherein the instructions further cause the one or more processors to validate the lineage anchor prior to regenerating the CRE.

26. The computer-readable medium of claim 23, wherein the instructions further cause the one or more processors to recalculate an audit signature after regenerating the CRE.

27. A computer-implemented method for generating and refining domain-specific composite relational entities (CREs) executed at one or more computer processors, the method comprising:

(a) generating using a plurality of relational synthesis engines each configured for a respective domain and comprising one or more model parameters, a plurality of domain-specific CREs, wherein each domain-specific CRE comprises a persistent identifier, governance metadata, trust coefficients, and a lineage anchor referencing a prior CRE state;

(b) updating the one or more model parameters of at least one of the plurality of relational synthesis engines using a governance-weighted update rule that modulates parameter updates based on the trust coefficients and governance metadata of at least one of the plurality of domain-specific CREs; and (c) regenerating a domain-specific CRE of the plurality of domain-specific CREs using the updated one or more model parameters.

28. The method of claim 27, wherein each domain-specific CRE comprises a domain identifier restricting cross-domain reuse.

29. The method of claim 27, wherein updating the one or more model parameters comprises using domain-specific feedback.

30. The method of claim 27, wherein updating the one or more model parameters is restricted unless a domain-continuity rule is satisfied.

* * * * *